United States Patent [19]

Tokiwa et al.

[11] Patent Number: 5,110,838
[45] Date of Patent: May 5, 1992

[54] BIODISINTEGRABLE THERMOPLASTIC RESIN FOAM AND A PROCESS FOR PRODUCING SAME

[75] Inventors: Yutaka Tokiwa, Tsuchiura; Akira Iwamoto, Tsukuba, both of Japan

[73] Assignees: Director-General of Agency of Industrial Science and Technology; JSP Corporation, both of Japan

[21] Appl. No.: 630,165

[22] Filed: Dec. 19, 1990

[30] Foreign Application Priority Data

Dec. 27, 1989 [JP] Japan .................... 1-339196

[51] Int. Cl.$^5$ .................... C08J 9/10; C08J 9/14
[52] U.S. Cl. .................... 521/81; 264/53; 264/54; 521/79; 521/134; 521/138; 521/139; 521/140; 521/916
[58] Field of Search .................... 264/53, 54; 521/79, 521/81, 134, 138, 139, 140, 916

[56] References Cited

U.S. PATENT DOCUMENTS

| | | | |
|---|---|---|---|
| 4,049,592 | 9/1977 | Maraws et al. | 521/916 |
| 4,076,655 | 2/1978 | Finberg | 521/916 |
| 4,197,371 | 4/1980 | Holst et al. | 521/916 |
| 4,256,851 | 3/1981 | Taylor et al. | 521/916 |

*Primary Examiner*—Morton Foelak
*Attorney, Agent, or Firm*—Lorusso & Loud

[57] ABSTRACT

A biodisintegrable thermoplastic resin foam and a process for producing same are disclosed, the biodisintegrable thermoplastic resin foam being comprised as a substrate thereof a mixed resin comprising 5–40 weight % of a thermoplastic resin decomposable by microorganisms and 95–60 weight % of a thermoplastic resin not decomposable by microorganisms and being characterized in that the individual aerial cells constituting the foam have an average cell wall thickness of 1–100 $\mu$m and an apparent density of 0.5 g/cm$^3$ or less than 0.5 g/cm$^3$. The biodisintegrable thermoplastic resin foam is easily disintegrable after disposal in an environment where microorganisms exist so that it can be reduced in bulkness and gives no harmful effect on the life of natural plant and animals. The foam incorporated with a filler can be promoted in disintegration by microorganisms. Thus the present invention affords an effective means for solving various problems in the treatment of disposed materials.

2 Claims, No Drawings

BIODISINTEGRABLE THERMOPLASTIC RESIN FOAM AND A PROCESS FOR PRODUCING SAME

BACKGROUND OF THE INVENTION

1. Field of the Invention

The present invention relates to a biodisintegrable thermoplastic resin foam and to a process for producing same. More particularly, the present invention relates to a biodisintegrable thermoplastic resin foam comprising a mixed resin of a thermoplastic resin decomposable by microorganisms and a thermoplastic resin not decomposable by microorganisms and having a specific apparent density and to a process for producing the foam which comprises melt-kneading the mixed resin and a foaming agent at high temperature and pressure and bringing the kneaded mixture to a low pressure zone to obtain a foam of a specific apparent density.

2. Description of the Prior Art

In connection with the treatment of waste goods, a movement of prohibiting or limiting the use of plastics as packaging materials is being encouraged in recent years in Europe and America. In particular, biodisintegrable plastics wherein plastics are incorporated with starch are now put into practice in U.S.A. The disintegration of plastics in this case is attained by chemical decomposition of starch in the plastics by the action of microorganisms. Such biodisintegrable plastics are known, for example, in U.S. Pat. Nos. 4,016,117, 4,021,388, 4,133,784 and 4,337,181. In case the amount of starch incorporated into the plastics is small, however, the desired disintegration will not take place. On the other hand, if the amount of starch is large, the disintegration of the plastics will certainly take place, but the incorporated starch is granular and devoid of any plasticity so that the resultant resin products such as resinous sheets are significantly inferior in mechanical properties and secondary processability, such as thermoformability in vacuum forming, pressure forming, matched die forming, etc. into containers or the like products to ordinary plastics containing no starch. Further, the use of such biodisintegrable plastics is limited only for the manufacture of films or bags where a secondary processing treatment is not required so much.

Anyway, all of the known conventional biodisintegrable resins are unsatisfactory in maintaining mechanical properties inherent to the pure resin components and are hardly processed to manufacture shaped articles.

Under the above circumstances, there is a great demand for developing new type biodisintegrable plastics which enable disintegration by microorganisms and prevent deterioration in mechanical properties and thermoformability by incorporation of a substance decomposable by microorganisms.

BRIEF SUMMARY OF THE INVENTION

Accordingly, it is an object of the present invention to provide a biodisintegrable thermoplastic resin foam which overcomes drawbacks of the prior art biodisintegrable resins incurring problems of difficulty in secondary processing of the resin due to deterioration of mechanical properties thereof.

It is another object of the present invention to provide a biodisintegrable thermoplastic foam comprised of a mixed resin of a thermoplastic resin decomposable by microorganisms and a thermoplastic resin not decomposable by microorganisms in a specific proportion and having a specific apparent density.

It is still another object of the present invention to provide a process for producing a biodisintegrable thermoplastic resin foam which comprises melt-kneading the mixed resin and a foaming agent at a high temperature and pressure and bringing the kneaded mixture to a low pressure zone.

It is further object of the present invention to provide the use of the biodisintegrable thermoplastic resin foam for manufacturing shaped articles therefrom.

As a result of extensive research made by the present inventors to develop a new type biodisintegrable resin which overcomes drawbacks as seen in the prior art similar resins, it has now been found that a foam derived from a mixed resin comprised of a thermoplastic resin decomposable by microorganisms and a thermoplastic resin not decomposable by microorganisms, which foam is so selected as to have a specific cell wall thickness of the individual aerial cells constituting the foam and a specific apparent density exhibits excellent biodisintegrability with good mechanical properties. The present invention has been accomplished on the basis of the above findings.

DETAILED DESCRIPTION OF THE INVENTION

In accordance with one embodiment of the present invention, there is provided a biodisintegrable thermoplastic resin foam which comprises as a substrate resin thereof a mixed resin of 5-40 weight % of a thermoplastic resin decomposable by microorganisms and 95-60 weight % of a thermoplastic resin not decomposable by microorganisms, characterized in that the individual aerial cells constituting the foam have an average cell wall thickness of 1-100 μm and that the foam has an apparent density of 0.5 g/cm$^3$ or less than 0.5 g/cm$^3$.

In accordance with a variant of the above embodiment, there is provided a biodisintegrable thermoplastic resin foam wherein the mixed resin is incorporated with a filler in an amount of 5-80 parts by weight based on 100 parts by weight of the mixed resin.

In accordance with another embodiment of the present invention, there is also provided a process for producing a biodisintegrable thermoplastic resin foam, which comprises melt-kneading a mixed resin of 5-40 weight % of a thermoplastic resin decomposable by microorganisms and 95-60 weight % of a thermoplastic resin not decomposable by microorganisms and a foaming agent, which is gaseous or liquid in normal state, at a high temperature above the melting point of the mixed resin under high pressure and thereafter bringing the kneaded mixture to a low pressure zone whereby a foam having an apparent density of 0.5 g/cm$^3$ or less than 0.5 g/cm$^3$ is obtained wherein the individual aerial cells constituting the foam have an average cell wall thickness of 1-100 μm.

In accordance with a variant of the above embodiment, there is provided a process for producing a biodisintegrable thermoplastic resin foam wherein the mixed resin is incorporated with a filler in an amount of 5-80 parts by weight based on 100 parts by weight of the mixed resin.

It is one of the gists of this invention that the foam comprises a mixed resin of a thermoplastic resin decomposable by microorganisms and a thermoplastic resin not decomposable by microorganisms in a specific proportion.

It is another gist of this invention that the foam has an apparent density of 0.5 g/cm³ or less than 0.5 g/cm³ and has an intercellar structure and that the individual cells have an average cell wall thickness of 1–100 μm.

The thermoplastic resin decomposable by microorganisms (referred to hereinafter simply as Resin A) is a known conventional one. Illustrative of Resin A are, for example, an aliphatic polyester resin, a block polymer of an aliphatic polyester with a low molecular polyamide, and polyvinyl alcohol. Typical examples of the aliphatic polyester resin include a polycondensate of an aliphatic polycarboxylic acid including dicarboxylic acid with an aliphatic polyhydric alcohol including diol, a polycondensate of an aliphatic hydroxycarboxylic acid, and a rings-opened polycondensate of a lactone. Specific examples of the aliphatic polyester include adipic acid esters of ethylene glycol and homopolymers or copolymers derived from propiolactone, caprolactone, and β-hydroxybutyric acid. These polymers are all capable of being hydrolyzed by the vital action of microorganism.

The thermoplastic resins not decomposable by microorganisms (referred to hereinafter simply as Resin B) include various known conventional resins, such as polystyrene resin. The polystyrene resins are composed of styrene as a predominant component thereof and includes a styrene homopolymer and a copolymer of styrene with a vinyl monomer compolymerizable therewith, a copolymer or mixture of polystyrene as a predominant component with a polymer of rubber series, which is generally called a high impact polystyrene resin, and a copolymer of styrene with a monomer of the diene series. The high impact polystyrene is preferable as its use enables enhancement of flexibility and elasticity of the resultant foam. Illustrative of the other Resin B are a polyolefin such as polyethylene, polypropylene, propylene-ethylene copolymer, polybutene or propylene-butene copolymer; chlorine containing resins such as polyvinyl chloride or polyvinylidene chloride; an aromatic polyester such as polyethylene terephthalate, polybutylene terephthalate; and various kinds of polyamide (nylon).

Aliphatic hydrocarbons, halogenated hydrocarbons and a fluorocarbon gas containing at least one hydrogen atoms in its molecule are used singly or in the form of a mixture as the foaming agent. Specific examples of the aliphatic hydrocarbon include, for example, propane, n-butane, isobutane, pentane, isopentane and the like lower hydrocarbons. As the halogenated hydrocarbons are mentioned, for example, chlorine or bromine substitutes of these aliphatic hydrocarbons. As the fluorocarbon gas containing at least one hydrogen atom in the molecule are mentioned, for example, chlorodifluoromethane, trifluoromethane, 1,2,2,2-tetrafluoroethane, 1-chloro-1,1-difluoroethane, 1,1-difluoroethane, and 1-chloro-1,2,2,2-tetraluoroethane. On the use of such foaming agent, it is necessary to select one having a boiling point (under 1 atm.) of lower than 80° C. Foaming agent having a boiling point above 80° C. are inferior in foaming efficiency and so are not economical. As the foaming agent, it is particularly desirable to select those having a boiling point with the range from −20° C. to 20° C. as the predominant ingredients.

In the present invention, the proportion of Resin A to Resin B based on the total weight of both Resins is such that Resin A is 5–40 % by weight, preferably 10–30 % by weight, while Resin B is 95–60 % by weight, preferably 90–70 % by weight. If the proportion of Resin A is less than the above range. the biodisintegrable foam will hardly be obtained. On the other hand. if the proportion of Resin A is more than the above range, molding of the mixed resin with foaming will become hard. The proportion of the foaming agent is 1–60 parts by weight, preferably 2–50 parts by weight based on 100 parts by weight of the mixed resin, i.e. the total weight of Resin A and Resin B, and is properly determined according to the density of the desired foam.

For foaming and molding the mixed resin, various known conventional methods as shown below can be used.

(1) An extrusion foaming and molding method

A method for obtaining a molded foam which includes melt-kneading a foaming agent, the mixed resin and an optional additive in an extruder and then extruding the kneaded mixture under low pressure through a die positioned in the front end of the extruder.

In accordance with this method, the mixed resin is extruded in the form of a film, sheet or plate according to the purpose. The molding in the form of a film or sheet is then processed under heating to a bag or container.

(2) An accumulator foaming and molding method

A method for obtaining a molded foam which comprises melt-kneading a foaming agent, the mixed resin and an optional additive in an extruder, maintaining the kneaded mixture in an accumulator under the condition that no foaming is allowed to take place and thereafter discharging the mixture under low pressure from the accumulator.

The mixture is usually extruded in the form of a plate and then processed to any suitable form.

(3) An injection foaming and molding method

A method for obtaining a molded foam which comprises melt-kneading a foaming agent, the mixed resin and an optional additive in an extruder, and then injecting the kneaded mixture to a metal die of a desired shape mounted to the front end of the extruder.

The moldings in compliance with the inner shape of the metal die are thus obtained.

(4) Beads foaming method

A method for obtaining foamed beads which comprises placing particles of the mixed resin, an aqueous medium and an optional additive in a autoclave, stirring the mixture with a foaming agent at a high temperature under high pressure to impregnate the resin particles with the foaming agent and then releasing the resin particles from the autoclave at a foaming temperature of the particles under low pressure, or a method for obtaining foamed beads which comprises impregnating the resin particles previously with a foaming agent and introducing them into a preliminary foaming machine where they are heated with steam to form foamed beads.

The resultant foamed beads are then molded in a mold to form a cushioning material, a container or the like article.

In order to obtain the foam excellent in biodisintegrability in the present invention, it is necessary that a sufficient foam structure be maintained in the resultant foam. According to the inventor's investigation, it has been found that the foam excellent in biodisintegrability is obtained by limiting the apparent density of the foam generally to 0.5 g/cm³, or less than 0.5 g/cm³, preferably 0.3-0.01 g/cm³ and by limiting the average cell wall thickness of the individual aerial cells constituting the foam to 1-100 μm. If the foam has an apparent density larger than 0.5 g/cm³, the foam will fail to show an excellent biodisintegrability. On the other hand, if the foam has an average cell wall thickness of the cells thinner than 1 μm, the cells will be abound in the portions of communicating intercellular structure and will involve various problems in the secondary processing step. For example, the secondary forming is so weak as to cause failure in molding of sheets under heating or to form a molded article having a number of voids among foamed beads in foamed beads-molding, etc.

The density of the foam and the cell wall thickness of the individual aerial cells are easily adjusted by the amount of the foaming agent used and also by the amount of a so-called cell-nucleus agent used. Illustrative of the cell-nucleus agents are, for example, inorganic substances such as talc, calcium carbonate, magnesium carbonate, clay, natural silicic acid, bentonite, feldspar, carbon black, white carbon, shirasu, and gypsum; substances capable of evolving a gas by decomposition at a temperature in an extruder such as sodium bicarbonate, ammonium carbonate, azide compounds, azo-bis-isobutyronitrile, diazoaminobenzene, benzenesulfonyl hydrazide; or a combination of an acid and an alkali capable of reacting together at a temperature in the extruder to generate carbon dioxide gas, such as a monoalkali salt of citric acid and an alkali metal salt of carbonic acid, a monoalkali metal salt of citric acid and an alkali metal salt of bicarbonic acid or the like chemical foaming agent.

In case the above inorganic substance is used as the cell-nucleus agent, it is used in an amount of 0.01-5 parts by weight based on 100 parts by weight of the mixed resin. In case the above chemical foaming agent is used as the cell-nucleus agent, it is used similarly in an amount of 0.05-5 parts by weight.

In the present invention, it is desirable to incorporate the foam of the mixed resin with a filler comprising the inorganic substance illustrated above in an amount of 5-80 parts by weight based on 100 parts by weight of the mixed resin. The foam of the mixed resin incorporated with such a large amount of the filler is promoted in biodisintegration. In case an especially large amount of the filler is used, it is desirable to adopt the above mentioned extrusion foaming and molding method, the accumulator foaming and molding method and the injection foaming and molding method for a method for foaming and molding the mixed resin.

In the present invention, a shrinkage-preventing agent may be added, if necessary, to the mixed resin to prevent rapid permeation of the foaming agent from the mixed resin foam thereby inhibiting shrinkage of the foam. As the shrinkage-preventing agent are mentioned, for example, polyoxyethylene monomyristate, polyoxypropylene monomyristate, polyoxyethylene monopalmitate, polyoxypropylene monopalmitate, polyoxyethylene monostearate, polyoxypropylene monostearate, polyoxyethylene distearate, monolauric acid glyceride, monomyristic acid glyceride, monopalmitic acid glyceride, monostearic acid glyceride, monoarachic acid glyceride, dilauric acid glyceride, dipalmitic acid glyceride, distearic acid glyceride, 1-palmito-2-stearic acid glyceride, 1-stearo-2-myristic acid glyceride, tristearic acid glyceride and the like various aliphatic esters. Such shrinkage-preventing agent is preferably used in case of using a polyolefin resin as Resin B.

The foam of the present invention is distinguished by possessing excellent biodisintegrability especially by microorganisms in soil. Such biodisintegrability is realized by a specific foamy structure and by incorporation of a thermoplastic resin with the resin decomposable by microorganisms. Even if molded articles have the same resin composition as in the present invention, those devoid of the specific foamy structure or those of a non-foamy structure fail to exhibit a good biodisintegrability.

The biodisintegrable thermoplastic resin foam of the present invention is easily disintegrated after disposal in an environment where microorganisms exist so that its bulkness can significantly be reduced. Therefore, the present invention affords an effective means for solving problems of treating disposed plastic materials. Even if the foam is left in natural environment after disposal without recovery, it is easily disintegrated by microorganisms and retains no toxic substance so that the foam gives no harmful effect on the life of natural plants and animals. In addition, there is an additional merit that the foam incorporated with the filler can be promoted in biodisintegration.

The present invention will be illustrated in more detail by way of Examples and Comparative Examples. Parts are by weight.

EXAMPLES 1-4, COMPARATIVE EXAMPLES 1-4

A mixed resin having a composition a shown in Table 1 in an amount of 100 parts by weight incorporated with a cell-nucleus agent as shown in Table 1 in an amount a shown similarly in Table 1 and butane (n-butane:isobutane 7:3) as a foaming agent in an amount as shown in Table 1 was melt-kneaded under pressure of 190 kg/cm³G in an extruder capable of discharging the contents in an amount of 50 kg/hour. The melt-kneaded mass was then extruded into the air in the form of a tube through a circular die mounted to the front end of the extruder at a temperature (foaming temperature) as shown in Table 1 under atmospheric pressure and the extruded tube was cut in an extruded direction to form a foam in the form of a sheet having a thickness of 2.5 mm. The foaming state of the resultant foam was observed and its apparent density, average cell wall thickness of individual aerial cells and biodisintegrability were measured. A result of the observation and the measurements is shown in Table 1.

EXAMPLE 5-7

A foamed sheet was obtained in the same manner as described in Example 1-4 except that talc was not used as the cell-nucleus agent and that the calcium carbonate as inorganic filler was incorporated into the mixed resin in an amount of 5 (Example 5), 40 (Example 6) and 75 (Example 7) parts by weight based on 100 parts by weight of the mixed resin. The resultant foamed sheet was observed and measured in the same manner as in Examples 1-4 and a result thereof is shown also in Table 1.

COMPARATIVE EXAMPLE 5

The foaming operation was carried out in the same manner as described in Example 7 except that 85 parts by weight of calcium carbonate was used. The resultant foamed sheet was observed and measured in the same manner as in Examples 1-4 and a result thereof is shown in Table 1.

TABLE 1

| | Resin Composition | | | | Amount of Butane (part) | Cell Nucleus Agent | | Foaming Temperature (°C.) | Foam State | Density (g/cm³) | Average Cell Wall Thickness (μm)*1 | Biodisintegrability (ppm)*2 | |
|---|---|---|---|---|---|---|---|---|---|---|---|---|---|
| | Resin A | | Resin B | | | | | | | | | After 8 hr Reaction | After 16 hr Reaction |
| | Sort | Amount (wt. %) | Sort | Amount (wt. %) | | Sort | Amount (part) | | | | | | |
| Ex. 1 | PCL | 15 | PS | 85 | 5 | talc | 1 | 135 | A | 0.08 | 10 | 48 | 80 |
| Ex. 2 | PCL | 25 | PS | 75 | 5 | talc | 1 | 130 | A | 0.08 | 10 | 60 | 100 |
| Ex. 3 | PCL | 35 | PS | 65 | 5 | talc | 1 | 125 | A | 0.1 | 10 | 110 | 180 |
| Ex. 4 | PCL | 30 | LDPE | 70 | 5 | talc | 1 | 105 | A | 0.1 | 10 | 135 | 230 |
| Comp. 1 | PCL | 4 | PS | 96 | 5 | talc | 1 | 145 | A | 0.1 | 10 | 0 | 5 |
| Comp. 2 | PCL | 42 | PS | 58 | 5 | talc | 1 | 120 | B | — | — | — | — |
| Comp. 3 | PCL | 25 | PS | 75 | 1 | talc | 0.5 | 130 | A | 0.7 | 105 | 12 | 20 |
| Comp. 4 | PCL | 25 | PS | 75 | 10 | talc | 4.5 | 130 | B | — | — | — | — |
| Ex. 5 | PCL | 25 | PS | 75 | 3 | — | — | 130 | A | 0.1 | 15 | 65 | 120 |
| Ex. 6 | PCL | 25 | PS | 75 | 3 | — | — | 130 | A | 0.25 | 15 | 70 | 160 |
| Ex. 7 | PCL | 25 | PS | 75 | 3 | — | — | 135 | A | 0.4 | 15 | 75 | 200 |
| Comp. 5 | PCL | 25 | PS | 75 | 3 | — | — | 135 | B | — | — | — | — |

Remarks:
*1 Measurement of an average cell wall thickness of the individual aerial cells:

The foamed sheet was cut at any desired portion in the direction of thickness and any desired 5 points of the cut surface were selected and the cell wall thickness of the aerial cells at these points were measured in the direction of thickness. The tabulated value is an average of the five measured values.

The operation for the measurement was carried out by using a MOS color camera OV 100 (Olympus KK, Japan) mounted to an optical microscope Model BH-2 (the same company as above) and measuring the thickness of the image screened on a monitor through a video microscaler Model IV-550 (Hoei KK, Japan).

*2 Test for biodisintegrability

In a 100 ml Erlenmeyer flask were placed 0.6 ml of a lipase solution having a factor capable of forming 220 μmol of fatty acids in one minute from olive oil, 2 ml of a pH buffer solution (pH 7), 1 ml of a surfactant, 16.4 ml of water and the sample (as 100 mg of Resin A in the sample). The mixture was then reacted together at 30° C. for 16 hours and the total organic matter formed after completion of the reaction was measured as total organic carbon (monomer and oligomers constituting polycaprolactone). To check the decomposition velocity of the resin, the total water-soluble organic matter was measured at the stage of reacting the mixture for 8 hours. As a control test, the experiment was carried out in the same manner as described above except that the lipase solution was not used, and the measured values were corrected on the control test.

The abbreviations used for resins in Table 1 are as follows:
PCL: polycaprolactone (density: 1.05 g/cm³, number average molecular weight: 70000)
PS: polystyrene (density: 1.05 g/cm³, number average molecular weight: 250000)
LDPE: low density polyethylene (density: 0.920 g/cm³, number average molecular weight: 100000)

In Table 1, the symbols A and B used for the foaming state have the following meanings:
A: The rate of closed cells is high and the condition of surface is good.
B: The rate of closed cells is low and a number of concavoconvexes are found on the surface.

As is evident from the result shown in Table 1, the foam of the present invention exhibits excellent biodisintegrability. Contrary to this, the foams of Comparative Examples are deteriorated in the quality of foam and in biodisintegrability. For example, the foam is significantly deteriorated in biodisintegrability in Comparative Example 1 wherein the proportion of Resin A is less than 5 % by weight. On the other hand, the foam is deteriorated in quality in Comparative Example 2 wherein the proportion of Resin A becomes larger than 40 % by weight. In case the foaming ratio becomes lower or an average cell wall thickness of the individual aerial cells becomes thicker as in Comparative Example 3, the foam is deteriorated in biodisintegrability. In contrast, the average membrane thickness becomes thinner, the quality of the foam becomes inferior as the portions of communicating intercellular structure becomes larger, as in Comparative Example 4. The foam becomes better in biodisintegrability when a large amount of the filler is incorporated into the mixed resin as seen in Examples 5-7. If the amount of the filler added is excessively large as in Comparative Example 5, however, the resultant foam will be deteriorated in quality.

Accordingly, the proportion of Resin A to Resin B, the proportion of the filler to the mixed resin, the apparent density of the foam, and the average cell wall thickness of the individual aerial cells are specifically limited as set forth in the appended claims.

It is understood that the preceding representative examples may be varied within the scope of the present specification both as to reactants and reaction conditions, by one skilled in the art to achieve essentially the same results.

As many widely, different embodiments of this invention may be made without departing from the spirit and scope thereof, it is to be construed that this invention is not limited to the specific embodiment thereof except as defined in the appended claims.

What is claimed is:
1. A process for producing a biodisintegrable thermoplastic resin foam, which comprises melt-kneading a mixed resin of 5-40 weight % of a thermoplastic resin decomposable by microorganisms and 95-60 % weight % of a thermoplastic resin not decomposable by microorganisms and a foaming agent, which is gaseous or liquid in normal state, at a high temperature above the melting point of the mixed resin under high pressure and thereafter bringing the kneaded mixture to a low pressure zone whereby a foam having an apparent density of less than 0.5 g/cm$^3$ is obtained wherein the individual aerial cells constituting the foam have an average cell wall thickness of 1-100 μm.

2. A process according to claim 1, wherein the mixed resin is incorporated with a filler in an amount of 5-80 parts by weight based on 100 parts by weight of the mixed resin.

* * * * *

UNITED STATES PATENT AND TRADEMARK OFFICE
CERTIFICATE OF CORRECTION

PATENT NO. : 5,110,838
DATED : May 5, 1992
INVENTOR(S) : TOKIWA et al

It is certified that error appears in the above-identified patent and that said Letters Patent is hereby corrected as shown below:

Col. 3, line 9, after "molecular" insert --weight--;

line 10, delete "weight";

line 56, delete "On" insert --In--; and

Signed and Sealed this

Tenth Day of August, 1993

Attest:

MICHAEL K. KIRK

Attesting Officer

Acting Commissioner of Patents and Trademarks